(12) United States Patent
Kim et al.

(10) Patent No.: US 10,177,883 B2
(45) Date of Patent: Jan. 8, 2019

(54) SIGNAL TRANSMISSION METHOD AND APPARATUS FOR USER EQUIPMENT IN MOBILE COMMUNICATION SYSTEM

(75) Inventors: Soeng-Hun Kim, Suwon-si (KR); Himke Van Der Velde, Dutch (NL)

(73) Assignee: Samsung Electronics Co., Ltd (KR)

( * ) Notice: Subject to any disclaimer, the term of this patent is extended or adjusted under 35 U.S.C. 154(b) by 881 days.

(21) Appl. No.: 12/534,999

(22) Filed: Aug. 4, 2009

(65) Prior Publication Data

US 2010/0027460 A1    Feb. 4, 2010

(30) Foreign Application Priority Data

Aug. 4, 2008    (KR) ................. 10-2008-0076142
Sep. 4, 2008    (KR) ................. 10-2008-0087276

(51) Int. Cl.
*H04L 1/18*    (2006.01)

(52) U.S. Cl.
CPC .......... *H04L 1/1874* (2013.01); *H04L 1/1819* (2013.01); *H04L 1/1887* (2013.01); *H04L 1/1893* (2013.01)

(58) Field of Classification Search
CPC ........ H04L 1/18–1/1896; H04L 1/1819; H04L 1/1874; H04L 1/1887; H04L 1/1893
See application file for complete search history.

(56) References Cited

U.S. PATENT DOCUMENTS 5,444,718 A * 8/1995 Ejzak .................... H04L 1/1614
714/748

6,021,124 A * 2/2000 Haartsen ............... H04L 1/1822
370/336

(Continued)

FOREIGN PATENT DOCUMENTS

CN    1132365    12/2003
CN    1788448    6/2006
(Continued)

OTHER PUBLICATIONS

3GPP TS 36.213 v8.3.0 (May 2008)—3rd Generation Partnership Project; Technical Specificaiton Group Radio Access Network; Evolved Universal Terrestrial Radio Access (E-UTRA); Physical Layer Procedures (release 8).*

(Continued)

*Primary Examiner* — Dung B. Huynh
(74) *Attorney, Agent, or Firm* — The Farrell Law Firm, P.C.

(57) ABSTRACT

A signal transmission method and apparatus of a user equipment for a mobile communication system is provided for improving data transmission reliability and efficiency by transmitting data based on precise discrimination of the uplink transmission resource assignment messages indicative of initial transmission and retransmission. A signal transmission method of a user equipment for a mobile communication system receives an uplink transmission resource assignment message from a base station determines whether a Hybrid Automatic Repeat reQuest (HARQ) buffer is empty, and when the HARQ buffer is empty, transmits to the base station a Media Access Control Protocol Data Unit (MAC PDU) generated with reference to information contained in the uplink transmission resource assignment message.

4 Claims, 11 Drawing Sheets

(56) References Cited

U.S. PATENT DOCUMENTS

| | | | | |
|---|---|---|---|---|
| 6,249,294 | B1* | 6/2001 | Lefebvre | G06F 3/14 345/504 |
| 6,552,665 | B1* | 4/2003 | Miyamae | E21B 47/12 340/853.3 |
| 6,836,862 | B1* | 12/2004 | Erekson | H04L 1/24 714/704 |
| 9,847,793 | B2* | 12/2017 | Murakami | H03M 13/1105 |
| 2002/0053058 | A1* | 5/2002 | Lee | H04L 1/0013 714/748 |
| 2002/0118671 | A1* | 8/2002 | Staples | H04L 12/6418 370/352 |
| 2002/0172217 | A1* | 11/2002 | Kadaba | H04L 1/0002 370/443 |
| 2002/0193106 | A1* | 12/2002 | Koo | H04L 29/06027 455/423 |
| 2003/0074476 | A1* | 4/2003 | Kim et al. | 709/246 |
| 2003/0123470 | A1* | 7/2003 | Kim et al. | 370/437 |
| 2003/0147371 | A1* | 8/2003 | Choi et al. | 370/341 |
| 2003/0203736 | A1* | 10/2003 | Chi et al. | 455/450 |
| 2004/0120306 | A1* | 6/2004 | Wigard | H04L 1/16 370/349 |
| 2004/0137930 | A1 | 7/2004 | Kim et al. | |
| 2004/0266466 | A1 | 12/2004 | Kim et al. | |
| 2005/0022097 | A1* | 1/2005 | Cheng | H04L 1/1816 714/774 |
| 2005/0022098 | A1* | 1/2005 | Vayanos et al. | 714/776 |
| 2005/0047416 | A1* | 3/2005 | Heo et al. | 370/395.4 |
| 2005/0094615 | A1* | 5/2005 | Kim et al. | 370/349 |
| 2005/0105494 | A1* | 5/2005 | Kim | H04L 1/0003 370/335 |
| 2005/0201453 | A1* | 9/2005 | Gu | H04L 1/0021 375/225 |
| 2005/0249163 | A1* | 11/2005 | Kim et al. | 370/335 |
| 2005/0276266 | A1 | 12/2005 | Terry | |
| 2005/0286533 | A1* | 12/2005 | Gu | H04L 1/0021 370/395.4 |
| 2006/0062173 | A1* | 3/2006 | Cheng et al. | 370/328 |
| 2006/0092973 | A1* | 5/2006 | Petrovic et al. | 370/469 |
| 2006/0171349 | A1* | 8/2006 | Holma | H04L 1/1845 370/328 |
| 2006/0209783 | A1* | 9/2006 | Jain | H04L 1/1812 370/349 |
| 2006/0256757 | A1* | 11/2006 | Kuusela | H04W 76/048 370/335 |
| 2006/0258364 | A1* | 11/2006 | Usuda et al. | 455/450 |
| 2007/0008990 | A1 | 1/2007 | Torsner | |
| 2007/0168826 | A1* | 7/2007 | Terry | H04L 1/1812 714/748 |
| 2007/0168827 | A1 | 7/2007 | Lohr et al. | |
| 2007/0189282 | A1* | 8/2007 | Lohr | H04B 7/022 370/370 |
| 2007/0214399 | A1 | 9/2007 | Lim et al. | |
| 2007/0259665 | A1* | 11/2007 | Chiu | H04L 1/1671 455/436 |
| 2007/0263740 | A1* | 11/2007 | Kwon | H04L 1/1812 375/260 |
| 2007/0283032 | A1 | 12/2007 | Kim et al. | |
| 2008/0008152 | A1* | 1/2008 | Lohr et al. | 370/342 |
| 2008/0084848 | A1* | 4/2008 | Jard et al. | 370/332 |
| 2008/0181163 | A1* | 7/2008 | Ye | H04L 1/1628 370/312 |
| 2008/0192674 | A1* | 8/2008 | Wang | H04L 1/1657 370/315 |
| 2008/0229168 | A1* | 9/2008 | Murakami | H04B 7/0413 714/751 |
| 2008/0285512 | A1* | 11/2008 | Pan et al. | 370/329 |
| 2008/0298387 | A1 | 12/2008 | Lohr et al. | |
| 2009/0022098 | A1* | 1/2009 | Novak | H04L 1/14 370/329 |
| 2009/0034466 | A1* | 2/2009 | Lindskog | H04L 1/0078 370/329 |
| 2009/0042519 | A1* | 2/2009 | Sudo | H04B 7/061 455/101 |
| 2009/0046793 | A1* | 2/2009 | Love | H04L 1/1607 375/260 |
| 2009/0052391 | A1* | 2/2009 | Park et al. | 370/329 |
| 2009/0086671 | A1* | 4/2009 | Pelletier et al. | 370/329 |
| 2009/0086682 | A1* | 4/2009 | Kazmi et al. | 370/335 |
| 2009/0125774 | A1* | 5/2009 | Kim et al. | 714/748 |
| 2009/0129317 | A1* | 5/2009 | Che et al. | 370/328 |
| 2009/0185528 | A1* | 7/2009 | Sambhwani et al. | 370/329 |
| 2009/0204862 | A1* | 8/2009 | Chun | H04L 1/1822 714/748 |
| 2009/0225708 | A1 | 9/2009 | Harada et al. | |
| 2009/0225737 | A1* | 9/2009 | Kim et al. | 370/342 |
| 2009/0257385 | A1* | 10/2009 | Meylan et al. | 370/329 |
| 2009/0259910 | A1* | 10/2009 | Lee et al. | 714/748 |
| 2009/0307554 | A1* | 12/2009 | Marinier | H04L 1/1812 714/748 |
| 2010/0002630 | A1* | 1/2010 | Park | H04L 1/1812 370/328 |
| 2010/0014478 | A1* | 1/2010 | Futagi | H04L 1/1819 370/329 |
| 2010/0074211 | A1* | 3/2010 | Kim et al. | 370/329 |
| 2010/0077272 | A1* | 3/2010 | Peisa | H04L 1/08 714/748 |
| 2010/0091725 | A1* | 4/2010 | Ishii | H04W 72/04 370/329 |
| 2010/0157916 | A1* | 6/2010 | Kim | H04L 1/1671 370/329 |
| 2010/0215004 | A1* | 8/2010 | Yoo | 370/329 |
| 2010/0235705 | A1 | 9/2010 | Kim et al. | |
| 2010/0238875 | A1* | 9/2010 | Sung et al. | 370/329 |
| 2010/0257419 | A1* | 10/2010 | Sung | G06F 11/1443 714/748 |
| 2010/0296454 | A1* | 11/2010 | Park | H04L 1/1812 370/328 |
| 2010/0325502 | A1* | 12/2010 | Lindskog et al. | 714/748 |
| 2011/0044195 | A1* | 2/2011 | Wiemann et al. | 370/252 |
| 2011/0044243 | A1* | 2/2011 | Yi | H04L 1/1812 370/328 |
| 2011/0083066 | A1* | 4/2011 | Chung et al. | 714/807 |
| 2011/0085507 | A1* | 4/2011 | Jongren | 370/329 |
| 2011/0085508 | A1* | 4/2011 | Wengerter et al. | 370/329 |
| 2011/0194502 | A1* | 8/2011 | Sung et al. | 370/329 |

FOREIGN PATENT DOCUMENTS

| | | |
|---|---|---|
| CN | 1914846 | 2/2007 |
| CN | 1969476 | 5/2007 |
| CN | 101009537 | 8/2007 |
| CN | 101039452 | 9/2007 |
| CN | 101053194 | 10/2007 |
| CN | 101060387 | 10/2007 |
| CN | 101155013 | 4/2008 |
| JP | 2009-533942 | 9/2009 |
| JP | 2010-502096 | 1/2010 |
| KR | 1020030079631 | 10/2003 |
| KR | 1020040064575 | 7/2004 |
| KR | 1020050046484 | 5/2005 |
| KR | 1020070082872 | 8/2007 |
| WO | WO 2007/129645 | 11/2007 |
| WO | WO 2008-041824 | 4/2008 |
| WO | WO 2008/081222 | 7/2008 |
| WO | WO 2008/085992 | 7/2008 |

OTHER PUBLICATIONS

Panasonic, NTT DoCoMo, "Joint Transport Format and Redundancy Version Signaling with Explicit NDI", R1-080973, 3GPP TSG-RAN WG1 Meeting #52, Feb. 15, 2008.
3GPP Technical Specification Group Radio Access Network; Evolved Universal Terrestrial Radio Access (E-UTRA) Medium Access Control (MAC) Protocol Specification (Release 8), Internet Citation, pp. 13-20, May 2008.
MAC Rapporteurs (Ericsson, Qualcomm Europe), "E-UTRA MAC Protocol Specification Update", R2-083410, 3GPP TSG-RAN2 Meeting #62bis, Jun. 30-Jul. 4, 2008, 34 pages.
Chinese Office Action dated May 27, 2016 issued in counterpart Application No. 201310727289.2, 11 pages.

(56) References Cited

OTHER PUBLICATIONS

Japanese Office Action dated May 23, 2016 issued in counterpart Application No. 2015-117003, 5 pages.
Chinese Office Action dated Feb. 23, 2017 issued in counterpart Application No. 201310727289.2, 11 pages.
Motorola, "PDCCH Scheduling Assignment Field Definition (MCS, RV, NDI)", R1-080436, 3GPP TSG RAN1 #51bis, Jan. 14-18, 2008.
Korean Office Action dated Jul. 25, 2014 issued in counterpart Application No. 10-2008-0087276.
Chinese Office Action dated Aug. 4, 2014 issued in counterpart Application No. 200980128880.8.

* cited by examiner

SIGNAL TRANSMISSION METHOD AND APPARATUS FOR USER EQUIPMENT IN MOBILE COMMUNICATION SYSTEM

PRIORITY

This application claims priority under 35 U.S.C. § 119(a) to applications entitled "SIGNAL TRANSMISSION METHOD AND APPARATUS FOR USER EQUIPMENT IN MOBILE COMMUNICATION SYSTEM" filed in the Korean Intellectual Property Office on Aug. 4, 2008 and Sep. 4, 2008, and assigned Serial No. 10-2008-0076142 and 10-2008-0087276, respectively, the contents of which are incorporated herein by reference.

BACKGROUND OF THE INVENTION

1. Field of the Invention

The present invention relates to a mobile communication system and, in particular, to a signal transmission method and apparatus of a User Equipment (UE) for a mobile communication system that is capable of improving data transmission reliability and efficiency by transmitting data based on the precise discrimination of the uplink transmission resource assignment messages indicative of initial transmission and retransmission.

2. Description of the Related Art

Universal Mobile Telecommunications System (UMTS) is one of the third generation (3G) mobile telecommunication technologies, which evolved from Global System for Mobile communications (GSM) and General Packet Radio Services (GPRS) systems and uses Wideband Code Division Multiple Access (WCDMA).

The $3^{rd}$ Generation Partnership Project (3GPP), which is responsible for the standardization of UMTS, is working to significantly extend the performance of UMTS in the Long Term Evolution (LTE) system. LTE is a 3GPP standard that provides for a downlink speed of up to 100 Mbps and is expected to be commercially launched in 2010.

In order to fulfill the requirements for the LTE systems, studies have been done in various aspects including minimization of the number of involved nodes in the connections and placing radio protocol as close to the radio channels as possible.

FIG. 1 is a diagram illustrating an LTE mobile communication system.

As shown in FIG. 1, the LTE mobile communication system utilizes the Evolved Radio Access Network (E-RAN) 110 and 112 having only two infrastructure nodes: the Evolved Node B (ENB or Node B) 120, 122, 124, 126, and 128 and the Access Gateway (AG) 130 and 132. A User Equipment (UE) 101 accesses the Internet Protocol (IP) network via the E-RAN 110 and 112.

The ENB's 120, 122, 124, 126, and 128 correspond to the conventional Node B which provides the UE 101 with radio access service. The ENB's 120, 122, 124, 126, and 128 are responsible for more complex functions than that of the conventional Node B. In the next generation wireless communication system, all user traffic including real time services such as Voice over IP (VoIP) are served through a shared channel. For this reason, there is a need for a device to collect status information of the UE's and scheduling based on the status information. Each of the ENBs 120, 122, 124, 126, and 128 is responsible for scheduling the UE's. In order to achieve the speed of 100 Mbps or faster, the wireless communication system exploits the radio access technology of Orthogonal Frequency Division Multiplexing (OFDM) on a 20 MHz bandwidth. Also, an Adaptive Modulation and Coding (AMC) scheme is supported for determining a modulation scheme and a channel coding rate according to the channel status of the UE 101.

FIG. 2 is a diagram illustrating a user plane protocol stack architecture of an LTE mobile communication system.

As shown in FIG. 2, the UE has a protocol stack including a Packet Data Convergence Protocol (PDCP) layer 205, a Radio Link Control (RLC) layer 210, a Media Access Control (MAC) layer 215, and a Physical (PHY) layer 220. Also, the ENB has a protocol stack including a PDCP layer 240, a RLC layer 235, a MAC layer 230, and a PHY layer 225.

The PDCP layers 205 and 240 are responsible for IP header compression/decompression. The RLC layers 210 and 235 pack the PDCP Packet Data Units (PDUs) into a size appropriate for transmission and performs an Automatic Repeat reQuest (ARQ) function. The data unit delivered from an upper layer entity is a PDU. The MAC layers 215 and 230 serve multiple RLC layer entities. The MAC layers 215 and 230 can multiplex the RLC PDUs produced by the RLC layer entities into a single MAC PDU and de-multiplex a MAC PDU into the RLC PDUs. The physical layers 220 and 225 perform encoding and modulation on the upper layer data to transmit it through a radio channel and perform demodulation and decoding on the OFDM symbol received through radio channel to deliver to upper layers.

In the LTE mobile communication system, a Hybrid Automatic Repeat reQuest (HARQ) is utilized for reliable transmission of uplink MAC PDUs. In the mobile communication system using HARQ, when a MAC PDU is not received, the receiver transmits a HARQ Non-Acknowledgement (NACK) to the transmitter such that the transmitter received the HARQ NACK retransmits the MAC PDU. The receiver performs soft combining to combine the initial transmission and the one or more retransmissions.

In the LTE mobile communication system, uplink resources are allocated by means of an uplink transmission resource assignment message.

FIG. 3 is a diagram illustrating a message format of an exemplary uplink transmission resource assignment message.

Referring to FIG. 3, the uplink transmission resource assignment message includes a Resource Block (RB) assignment field 305 carrying information on the amount and position of the resource. In the LTE mobile communication system, the resource is assigned in a unit of a resource block defined with a predetermined frequency bandwidth of a length of 1 msec, and the assigned resources are indicated by the RB assignment field 305.

The uplink transmission resource assignment message also includes a Modulation and Coding Scheme (MCS) field 310 which indicates the adaptive modulation and coding formats to be adopted to the transmission data. This field is 5 bits and can carries one of 29 code points indicating combinations of Quadrature Phase Shift Keying (QPSK) and 0.11 channel coding rate to 64 Quadrature Amplitude Modulation (64QAM) and 0.95 channel coding rate. The rest three code points are used to indicate the Redundancy Version (RV). The MCS field 310 is described in more detail with reference to Table 1.

TABLE 1

| MCS Index $I_{MCS}$ | Modulation Order $Q'_m$ | TBS Index $I_{TBS}$ | Redundancy Version $rv_{idx}$ |
| --- | --- | --- | --- |
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | | reserved | 1 |
| 30 | | | 2 |
| 31 | | | 3 |

Table 1 is specified in the 3GPP 36.213 V8.6.0 Technical Specification for showing the relationship between Transport Block Size (TBS) index and RV according to the MCS index contained in the MCS field 310. Referring to Table 1, for MCS levels from 0 to 28 indicates RV=0 and respective TBS indices, and the MCS levels from 29 to 31 indicates RV=1, 2, and 3, respectively with no TBS index.

The uplink transmission resource assignment message also includes a New Data Indicator (NDI) 315. The NDI 315 is 1 bit information to indicate whether the transmission resource assignment message is of either an initial transmission or retransmission.

The uplink HARQ operation with the NDI of the uplink transmission resource assignment message is described in FIG. 4.

FIG. 4 is a diagram illustrating a successful HARQ operation in the conventional mobile communication system using the NDI of the uplink transmission resource assignment message.

Referring to FIG. 4, a UE receives an uplink transmission resource assignment message 405 at a point in time and transmits a MAC PDU using the uplink resource 415 and MCS level indicated by the uplink transmission resource assignment message 405 after time T 410 elapses. In order to simplify the explanation, the MAC PDU transmitted through the resource assigned with the uplink transmission resource assignment message 405 will be referred to as MAC PDU A. Until the MAC PDU A is completely transmitted, i.e. before a HARQ ACKnowledgement (ACK) on the MAC PDU A is received or the maximum number of retransmission times is reached, the UE repeats retransmissions 420 and 425 at interval of HARQ Round Trip Time (RTT) 417. The MAC PDU A transmission is completed at a specific point in time, and the UE receives a new uplink transmission resource assignment message 430 from the ENB. The NDI of the new uplink transmission resource assignment message is set to a value different from that of the previous uplink transmission resource assignment message 405. If the NDI value change is detected, then the UE regards the uplink transmission resource allocation message as a new MAC PDU request message and starts transmitting a new MAC PDU, e.g. MAC PDU B, through the uplink resource 435. As aforementioned, the UE repeats transmission 440 at interval of the HARQ RTT.

In order to manage the transmission resources efficiently, the ENB can assign the different resources for retransmission of the current MAC PDU. This technique is called adaptive retransmission. By transmitting the uplink transmission resource allocation message having the same NDI, the ENB can request the UE for adaptive retransmissions. For instance, if the ENB wants to receive the MAC PDU B through a new RB after transmitting the uplink transmission resource assignment message 430, then the ENB transmits an uplink transmission resource assignment message 433 of which NDI (=1) is identical to that of the previous uplink transmission resource assignment message 430 along with the new resource assignment information. If an uplink transmission resource allocation message of which NDI is identical to that of the previous uplink transmission resource allocation message is received, then the UE determines that the adaptive retransmission is requested so as to transmit the MAC PDU B using the newly assigned transmission resource 445 and 450.

To determine whether the uplink transmission resource assignment message is of an initial transmission or retransmission is possible under the assumption that the UE receives all the uplink transmission resource allocation messages are received successfully.

FIG. 5 is a diagram illustrating a HARQ operation failure in the conventional mobile communication system using NDI of the uplink transmission resource assignment message.

Referring to FIG. 5, a UE receives an uplink transmission resource assignment message 505 at a point in time and transmits a MAC PDU using the uplink source 515 and MCS level indicated by the uplink transmission resource assignment message 505 and repeats retransmissions 520 of the MAC PDU at an interval of the HARQ RTT as shown in FIG. 4. After receiving the MAC PDU completely, the ENB transmits a new uplink transmission resource allocation message 525 of which NDI (=1) is different from that (=0) of the previous uplink transmission resource allocation message 505. In the case where the new uplink transmission resource allocation message 525 is lost, the UE may receive another uplink transmission resource allocation message 530 having the NDI (=0) identical to that of the previous uplink resource transmission resource allocation message 505 without being aware of the lost uplink transmission resource allocation message 525 of which NDI is set to 1. Since the NDI (=0) of the uplink transmission resource allocation message 530 is the first message after receiving the previous uplink transmission resource allocation message 505 in view of the UE and the NDIs of the two successively received messages are identical to each other, the UE misidentifies that the uplink transmission resource allocation message 530 is a retransmission request message.

SUMMARY OF THE INVENTION

In order to overcome at least the problems of the prior art, the present invention provides a signal transmission method and apparatus for a user equipment (UE) in a mobile communication system that is capable of improving data transmission reliability and efficiency of the UE by transmitting data based on the precise discrimination of uplink transmission resource assignment messages indicative of initial transmission and retransmission.

Also, the present invention provides a signal transmission method and apparatus for a UE in a mobile communication system that is capable of improving a hybrid automatic repeat request operation of the UE by discriminating the uplink transmission resource assignment messages indicative of initial transmission and adaptive retransmission that are transmitted by an ENB.

Also, the present invention provides a signal transmission method and apparatus for a UE in a mobile communication system that is capable of reducing resource waste by running a hybrid automatic repeat request mechanism with accurate discrimination of uplink transmission resource assignment messages indicative of initial transmission and adaptive retransmission that are transmitted by an ENB.

In accordance with an embodiment of the present invention, a signal transmission method of a user equipment for a mobile communication system includes receiving an uplink transmission resource assignment message from a base station; determining whether a Hybrid Automatic Repeat reQuest (HARQ) buffer is empty; and transmitting, when the HARQ buffer is empty, a Media Access Control Protocol Data Unit (MAC PDU) generated with reference to information contained in the uplink transmission resource assignment message to the base station.

In accordance with an embodiment of the present invention, a user equipment for a mobile communication system includes a transmission/reception unit which communicates Physical Downlink Control Channel (PDCCH) and traffic through a radio channel; a PDCCH processing unit which extracts an uplink transmission resource assignment message from the PDCCH received by the transmission/reception unit; a transmission resource control unit which determines whether the uplink transmission resource assignment message is indicative of initial transmission of a new Media Access Control Protocol Data Unit (MAC PDU), adaptive retransmission of a previous MAC PDU, adaptive retransmission of a new MAC PDU based on a Hybrid Automatic Repeat reQuest (HARQ) buffer status and a New Data Indicator (NDI) and a Redundancy Version (RV) contained in the uplink transmission resource assignment message; a HARQ unit which performs HARQ operation; and an upper layer unit which processes upper layer operations of a Radio Link Control (RLC) device, a Packet Data Convergence Protocol (PDCP) device, and a MAC multiplexer.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

In the conventional HARQ mechanism in which a UE uses only the NDI to discriminate the uplink transmission resource assignment messages indicative of initial transmission and retransmission, the UE may fail to discriminate the messages. In some embodiments of the present invention the UE discriminates the uplink transmission resource assignment messages indicative of initial transmission and retransmission in consideration of the NDI, RV and HARQ buffer status so as to improve the discrimination accuracy.

Typically, the uplink transmission resource assignment message indicative of an initial transmission of a new packet takes place after the previous packet transmission has completed even though the uplink transmission resource assignment message has the NDI identical to that of the previous uplink transmission resource assignment message. In consideration of this feature, according to some embodiments of the present invention, the UE the received the uplink transmission resource assignment message indicative of initial transmission in a HARQ process calculates the last available retransmission time and, if the last available retransmission time has expired, flushes the HARQ buffer even though the MAC PDU transmission has failed. Also, if the HARQ buffer has no data when an uplink transmission resource assignment message is received in a HARQ process, i.e. the uplink transmission resource assignment message indicates the first uplink transmission resource assignment message after flushing the HARQ buffer, then the UE determines that the uplink transmission resource assignment message is indicative of initial transmission of a new MAC PDU regardless of the NDI value of the uplink transmission resource assignment message.

Figure 1:
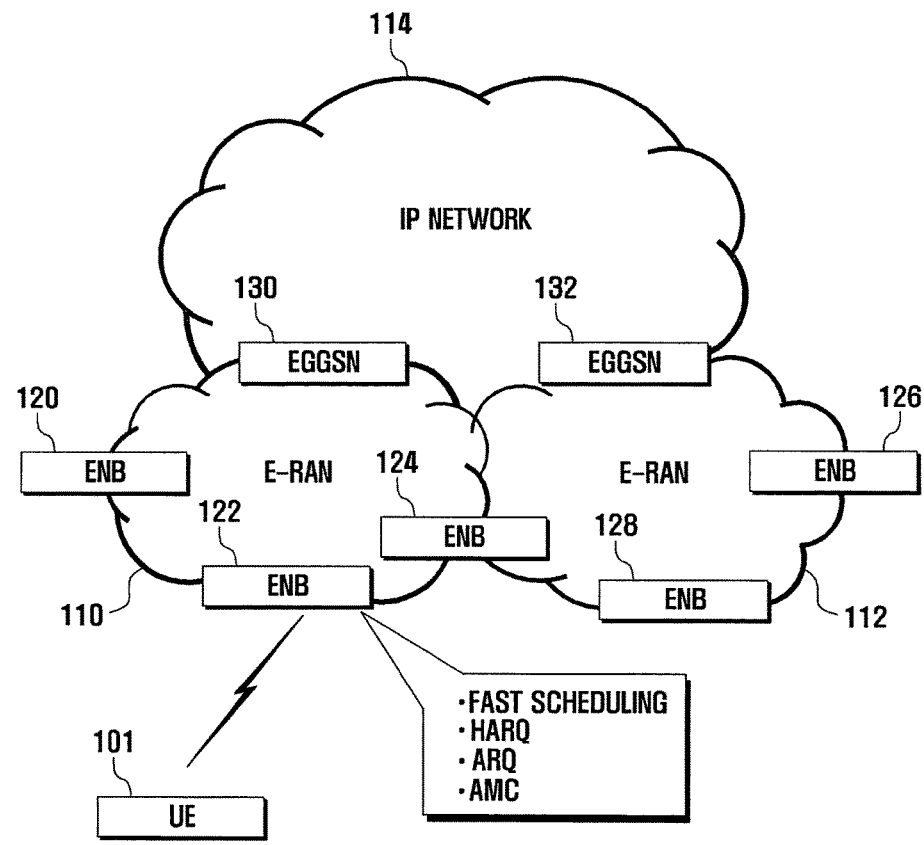
FIG. 1 is a diagram illustrating an LTE mobile communication system.
Figure 2:
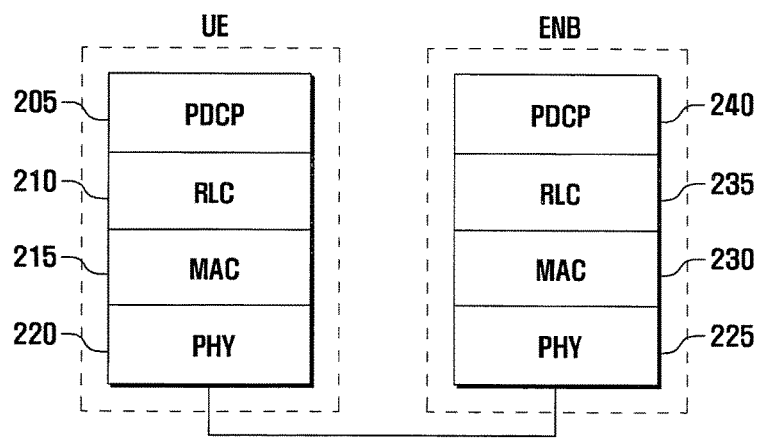
FIG. 2 is a diagram illustrating a user plane protocol stack architecture of an LTE mobile communication system.
Figure 3:
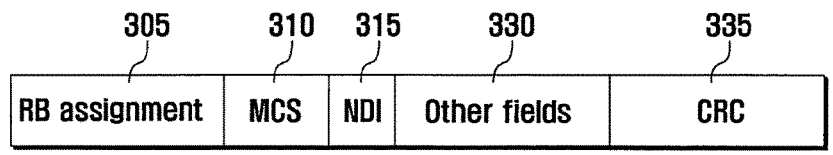
FIG. 3 is a diagram illustrating a message format of an exemplary uplink transmission resource assignment message.
Figure 4:
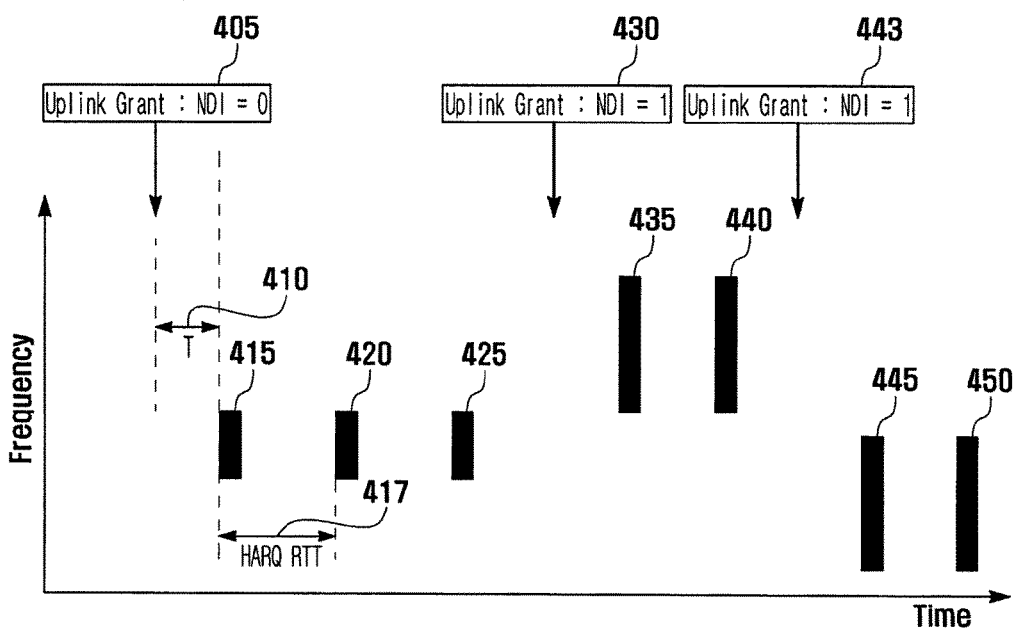
FIG. 4 is a diagram illustrating a successful HARQ operation in the conventional mobile communication system using the NDI of the uplink transmission resource assignment message.
Figure 5:
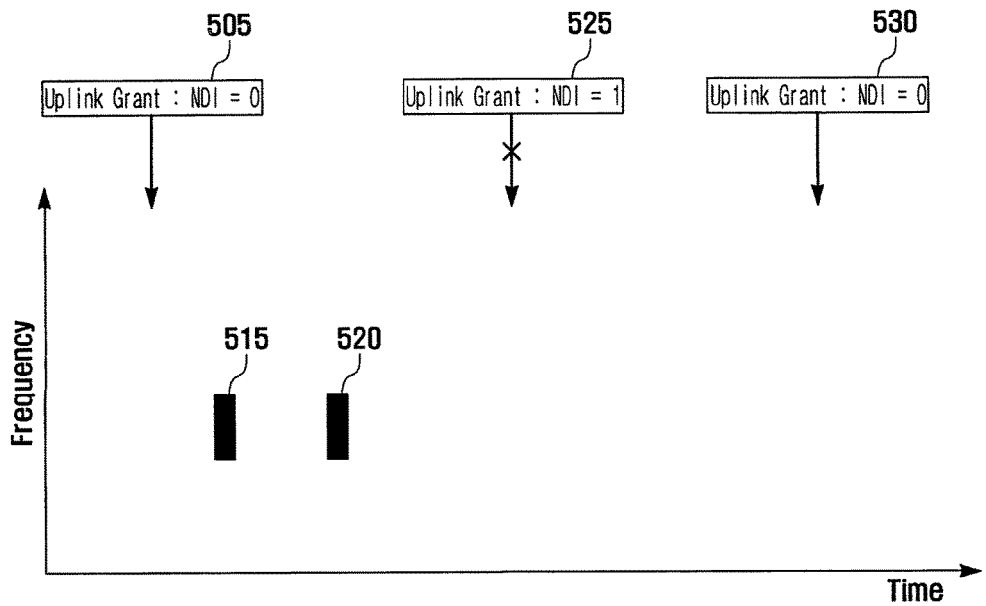
FIG. 5 is a diagram illustrating a HARQ operation failure in the conventional mobile communication system using NDI of the uplink transmission resource assignment message.
Figure 6:
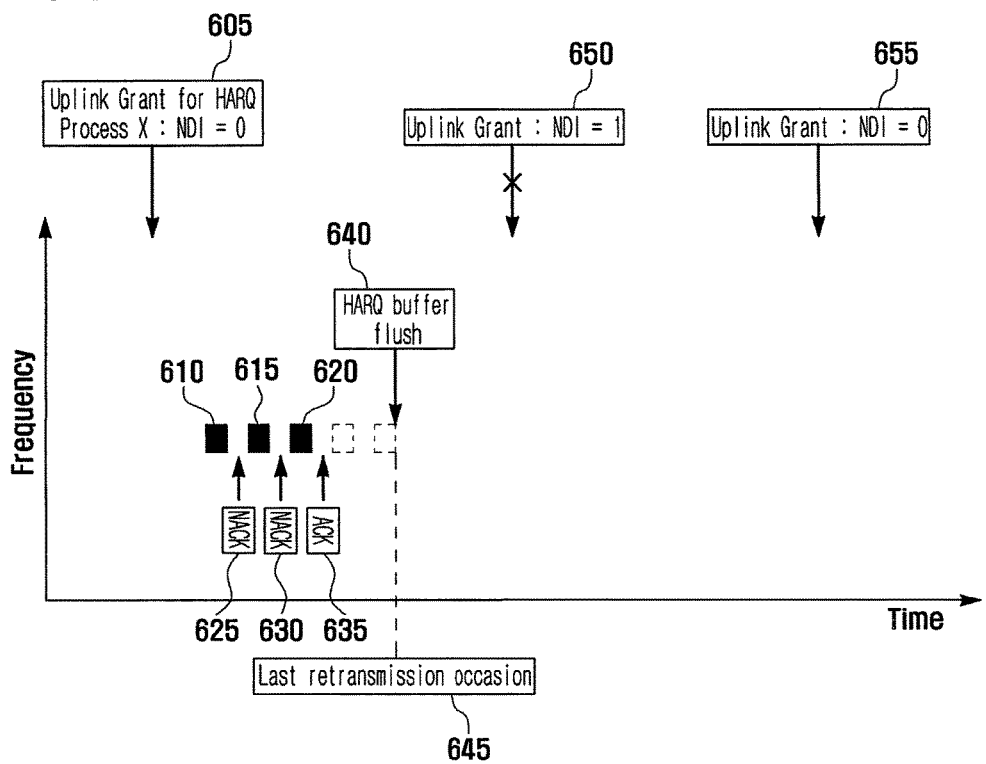
FIG. 6 is a diagram illustrating a problematic situation that can be encountered in a mobile communication system and solved with a signal transmission method according to an embodiment of the present invention.

FIG. 6 is a diagram illustrating a problematic situation that can be encountered in a mobile communication system and solved with a signal transmission method according to an embodiment of the present invention.

Referring to FIG. 6, the UE receives an uplink transmission resource assignment message 605 indicative of an initial transmission of a new packet for a HARQ process X. Once the uplink transmission resource assignment message 605 indicative of an initial transmission of a new packet is received, the UE waits for a time T to elapse from the point in time at which the uplink transmission resource assignment message is received and transmits a MAC PDU 610 using the uplink transmission resource indicated by the uplink transmission resource assignment message for the HARQ process X. If a NACK 625 is received in response to the MAC PDU 610, then the UE retransmits the MAC PDU 615. The retransmission 615 and 620 of the MAC PDU repeats in response to the NACK 625 and 630 at an interval of HARQ RTT. The retransmission can be repeated until a maximum retransmission time is reached. In FIG. 6, the UE receives a HARQ ACK 635 in response to the MAC PDU. Upon receipt of the HARQ ACK 635, the UE stops retransmission of the MAC PDU. Next, the UE monitors the maximum retransmission time and flushes the HARQ buffer 640 for the HARQ process X when the maximum retransmission time is reached 645. In FIG. 6, an uplink transmission resource assignment message 650 indicative of initial transmission of a new MAC PDU is transmitted for the HARQ process X after the UE has completed the transmission of the previous MAC PDU 620 but the UE fails to receive the uplink transmission resource assignment message 650. In this case, since no MAC PDU is transmitted by the UE, the ENB repeats noise decoding at an interval of the HARQ and determines that the MAC PDU transmission of the UE is terminated with a failure when the last available retransmission time has expired. After some time elapses from the transmission of the previous uplink transmission resource assignment message 650, the ENB transmits another uplink transmission resource assignment message 655 indicative of initial transmission of a new MAC PDU to the UE, and the UE receives the uplink transmission resource assignment message 655. In this case, the NDI of the uplink transmission resource assignment message 655 is set to 0, identical to the NDI of the uplink transmission resource assignment message 605 which the UE has received most recently. If referring to the NDI for discriminating whether the uplink transmission resource assignment message 655 is indicative of initial transmission or retransmission, then the UE misidentifies the uplink transmission resource assignment message 655 indicative of initial transmission of a new MAC PDU as an uplink transmission resource assignment message indicative of retransmission of previous MAC PDU. In an embodiment of the present invention the UE checks the HARQ buffer status in order to avoid such misidentification. If the HARQ buffer is not empty, then the UE discriminates the uplink transmission resource assignment message with reference to the NDI. Otherwise if the HARQ buffer is empty, then the UE determines that the uplink transmission resource assignment message is indicative of initial transmission of a new MAC PDU regardless of the NDI.

Figure 7:
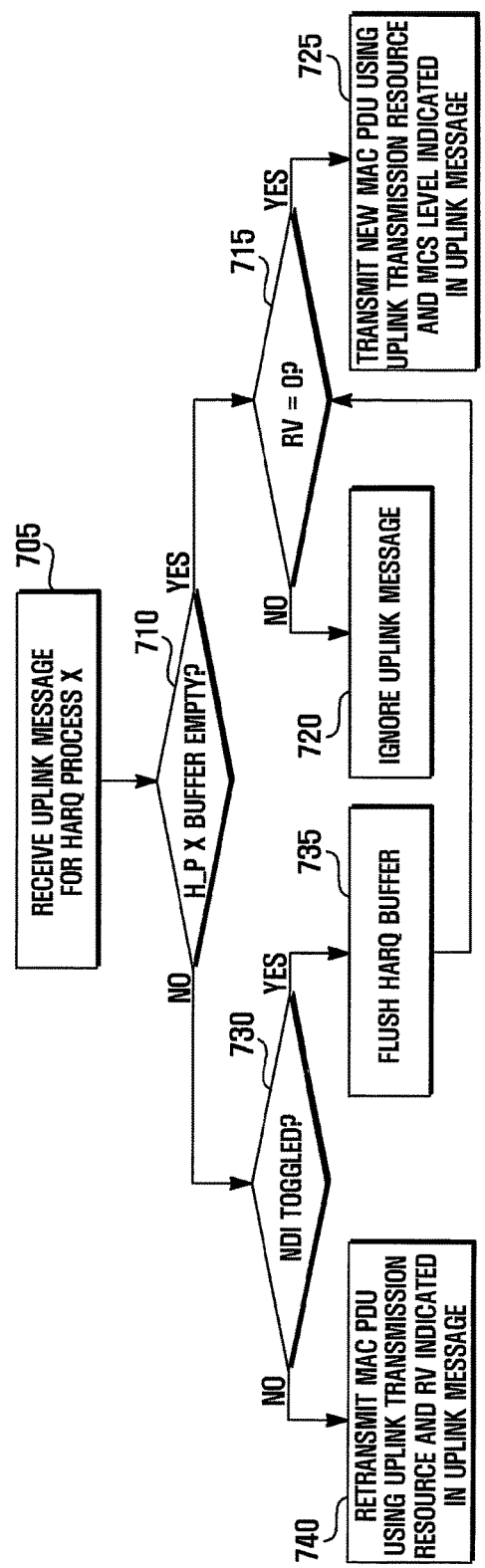
FIG. 7 is a flowchart illustrating a signal transmission method for a mobile communication system according to an embodiment of the present invention.

FIG. 7 is a flowchart illustrating a signal transmission method for a mobile communication system according to an embodiment of the present invention.

Referring to FIG. 7, a UE receives an uplink transmission resource assignment message for a HARQ process in step 705. Once the uplink transmission resource assignment message is received, the UE determines whether the HARQ buffer for the HARQ process is empty in step 710. If the HARQ buffer is empty, then the UE determines that the uplink transmission resource assignment message is indicative of initial transmission of a new MAC PDU, and the process goes to step 715. Otherwise, if the HARQ buffer is not empty, the process goes to step 730. At step 730, then the UE determines whether the NDI of the uplink transmission resource assignment message is toggled, i.e. whether the uplink transmission resource assignment message is indicative of initial transmission of a new MAC PDU or retransmission of previous MAC PDU.

If the HARQ buffer is empty at step 710, this means that the UE is requesting to transmit a new PDU using the uplink transmission resource indicated by the uplink transmission resource assignment message. At step 715, the UE checks the Redundancy Version (RV) to determine whether the RV is set to 0. The RV set to 0 means that the uplink transmission resource assignment message is indicative of initial transmission of a new MAC PDU rather than retransmission. If the RV is set to 0, then the process goes to step 725. If the RV is set to a value other than 0, then the process goes to step 720. Before further progress of the explanation, the RV is described in more detail with reference to FIGS. 8 and 9.

Figure 8:
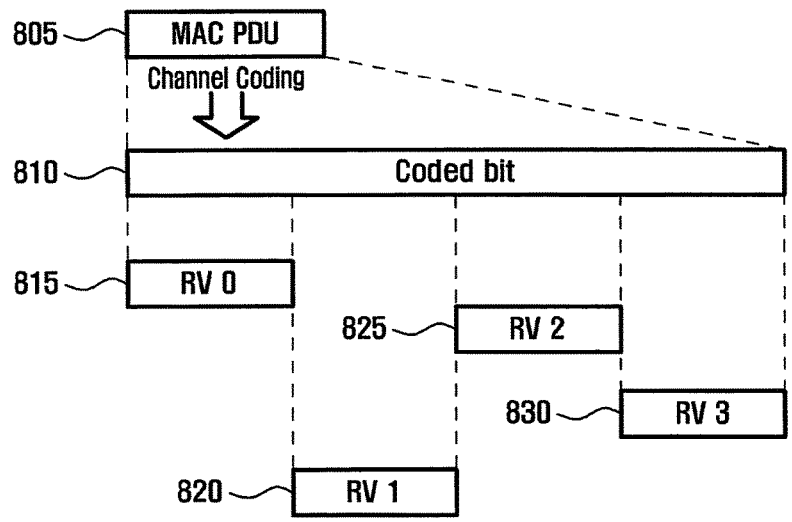
FIG. 8 is a diagram illustrating a sequence of Redundancy Versions (RVs) for requesting data retransmission in a mobile communication system according to an embodiment of the present invention.
Figure 9:
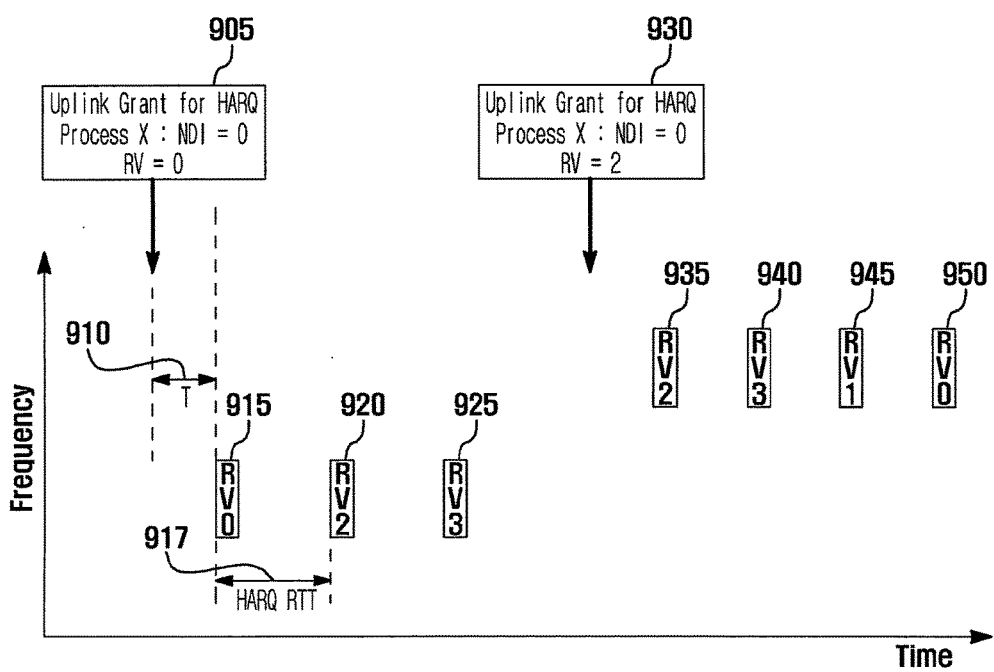
FIG. 9 is a diagram illustrating how to set RVs for adaptive retransmission in a mobile communication according to an embodiment of the present invention.

FIG. 8 is a diagram illustrating a sequence of Redundancy Versions (RVs) for requesting data retransmission in a mobile communication system according to an embodiment of the present invention, and FIG. 9 is a diagram illustrating how to set RVs for adaptive retransmission in a mobile communication system according to an embodiment of the present invention.

Referring to FIGS. 8 and 9, the RV field is used to indicate a part of the original data to be retransmitted in the HARQ process. The uplink transmission resource assignment message indicative of initial transmission of a new MAC PDU includes the transmission resource assignment information the MCS level information. The UE that received an uplink transmission resource assignment message determines the size of the data to be transmitted based on the number of resource blocks and MCS level indicated by the uplink transmission resource assignment message and generates a MAC PDU 805 of the determined size. The MAC PDU is channel-coded according to the MCS level indicated by the uplink transmission resource assignment message, and the channel-coded data 810 is stored in the HARQ buffer for the corresponding HARQ process. The UE transmits a part of the channel-coded data 810 which is indicated by the RV and performs retransmission in a sequential order of the RV value.

The sequence of RVs is defined to be RV0, RV2, RV3, and RV1, and the UE repeats retransmissions in the sequence cyclically. The RV0, RV1, RV2, and RV3 point to the respective parts 815, 820, 825, and 830 constituting the channel coded data 810. In practice, the parts pointed to by the RVs are not continuous unlike the exemplary case shown in FIG. 8. In general, the transmission is started from the RV0 815 and then in order of RV2 825, RV3 830, and RV1 820. The transmission order is cyclic such that the data pointed to by the RV1 815 is transmitted after the last part of the channel coded data has been transmitted. In the case of an adaptive retransmission, the RV can be indicated in the uplink transmission resource assignment message indicative of the adaptive retransmission. For instance, if an uplink transmission resource assignment message 905 indicative of initial transmission of a new MAC PDU is received at a point in time, then the UE transmits the part (of the MAC PDU) pointed to by the RV0 915 through the assigned uplink transmission resource after the time T 910 elapses from the receipt of the uplink transmission resource assignment message. Assuming that the MAC PDU is continuously retransmitted, the UE sequentially transmits the parts pointed to by the RV2 920 and RV3 925 through the same uplink transmission resource at intervals of the HARQ RTT. At this time, if it is required to move the retransmission of the UE to another uplink transmission resource, then the ENB transmits an uplink transmission resource assignment message 930 of which NDI is identical to that of the previous uplink transmission resource assignment message indicative of initial transmission of the new MAC PDU. At this time, the ENB may change the sequential order of the RVs by resetting the value of the RV of the uplink transmission resource assignment message for the adaptive retransmission. For instance, if the ENB resets the RV of the uplink transmission resource assignment message for the adaptive retransmission to 2, then the UE transmits the data pointed to by the RV2 935 although it is time to transmit the data pointed to by the RV1, and the changed sequence is maintained until the transmission is completed or the sequence is changed by the ENB again. That is, the sequence is changed such that the RV3 940, RV1 945, RV0 950 are sequentially transmitted following the RV2 935. As described above, the RV set to 0 indicates that the uplink transmission resource assignment message is indicative of initial transmission of a new message rather than adaptive retransmission. Accordingly, the UE generates a new MAC PDU with reference to the information indicated by the uplink transmission resource assignment message and stores the MAC PDU within the HARQ buffer after channel coding, and transmits a data part pointed to by the RV of the uplink transmission resource assignment message at step 725.

Strictly speaking, the RV can be set to 0 for the uplink transmission resource assignment message indicative of the adaptive retransmission. For instance, if the uplink transmission resource assignment message indicative of the adaptive retransmission transmitted to the UE which is preparing the fifth transmission, then the sequence returns to the original RV sequence so as to be more efficient. Nevertheless, if it is permitted for the ENB to use the RV0 for the adaptive retransmission, there can be a possibility that the UE may misidentify the uplink transmission resource assignment message indicative of adaptive retransmission as the uplink transmission resource assignment message indicative of initial transmission or vice versa. Accordingly, in the embodiments of the present invention, it is not permitted for the ENB to use the RV0 for adaptive retransmission. In other words, the ENB must set the RV of the uplink transmission resource assignment message, which is transmitted at a time reserved for the data pointed to by the RV0 and indicative of the adaptive retransmission, to a non-zero value. With this strategy, it is possible to secure the protocol reliability with little compromise of transmission efficiency.

Returning to FIG. 7, if the RV is not set to 0 at step 715, then the UE determines that the uplink transmission resource assignment message is indicative of adaptive retransmission of a new MAC PDU, and this means that an uplink transmission resource assignment message indicative of initial transmission of a new MAC PDU is lost before receiving the uplink transmission resource assignment message that is indicative of adaptive retransmission. As described above, the HARQ retransmission is restricted to the maximum number of HARQ transmissions. Accordingly, when the uplink transmission resource assignment message indicative of initial transmission is lost, the UE does not know how many times the uplink transmission resource assignment message indicative of adaptive retransmission is transmitted. If the last possible retransmission point in time is misidentified, then the UE may transmit the data through an unavailable uplink transmission resource that is not reserved for the UE at that time, resulting in interference. Accordingly, if the RV of the uplink transmission resource assignment message is set to a nonzero value and the HARQ buffer is empty, then the UE ignores the uplink transmission resource assignment message and does not transmit data in step 720.

If the HARQ buffer is not empty at step 710, then the UE determines whether the NDI of the current uplink transmission resource assignment message is toggled as compared to the last previously received uplink transmission resource assignment message in step S730. If the NDI is toggled, i.e. the NDI of the current uplink transmission resource assignment message is not identical to the NDI value of the last previously received uplink transmission resource assignment message for the HARQ process, then the UE determines that the uplink transmission resource assignment message is indicative of initial transmission of a new MAC PDU and flushes the HARQ buffer in step 735. After flushing the HARQ buffer, the process goes to step 715. Otherwise, if the NDI is not toggled, then the UE determines that the uplink transmission resource assignment message is indicative of adaptive retransmission of previous MAC PDU and transmits the part of the coded data, which is stored in the HARQ buffer pointed by the RV, using the uplink transmission indicated by the uplink transmission resource assignment message in step 740.

Figure 10:
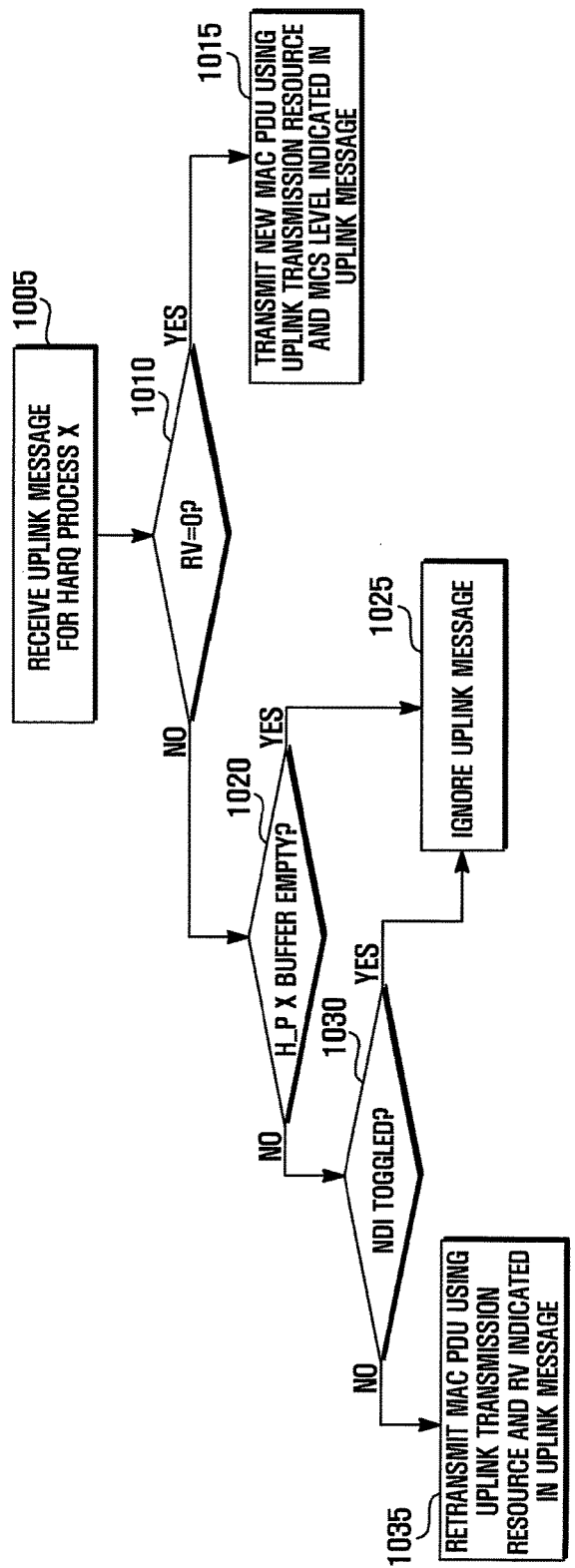
FIG. 10 is a flowchart illustrating a signal transmission method for a mobile communication according to an embodiment of the present invention in view of UE.

FIG. 10 is a flowchart illustrating a signal transmission method for a mobile communication system according to an embodiment of the present invention in view of UE. The HARQ procedure depicted in FIG. 10 is substantially similar to that of FIG. 7 but more simplified by inspecting the RV prior to the HARQ buffer inspection.

Referring to FIG. 10, a UE receives an uplink transmission resource assignment message for a HARQ process X in step 1005. Once the uplink transmission resource assignment message is received, the UE determines whether the RV of the uplink transmission resource assignment message is set to 0 in step 1010. If the RV is set to 0, then the UE determines that the uplink transmission resource assignment message is indicative of initial transmission of a new MAC PDU such that the process goes to step 1015. At step 1015, the UE generates a new MAC PDU and performs channel coding on the MAC PDU based on the information contained in the uplink transmission resource assignment message, stores the channel coded data within the HARQ buffer, and then transmits the part of the channel coded data which is pointed to by an RV of the uplink transmission resource assignment message, i.e. RV0.

Otherwise, if the RV is not set to 0, then the UE determines whether the HARQ buffer for the HARQ process X is empty, i.e. whether the uplink transmission resource assignment message is indicative of initial transmission of a new MAC PDU in step 1020. If the HARQ buffer is empty, then the UE determines that the uplink transmission resource assignment message is indicative of adaptive retransmission of a new MAC PDU. If the RV is not set to 0 and the HARQ buffer is empty, this means that an uplink transmission resource assignment message indicative of initial transmission of a new PDU is lost before receiving the current uplink transmission resource assignment message such that the UE ignores the currently received uplink transmission resource assignment message and does not transmit data in step 1025. If the HARQ buffer for the corresponding HARQ process is not empty at step 1020, then the UE determines whether the NDI of the current uplink transmission resource assignment message is toggled as compared to the NDI value of the last previously received uplink transmission resource assignment message in step 1030.

If the NDI of the current uplink transmission resource assignment message is toggled as compared to the NDI value of the last previously received uplink transmission resource assignment message, i.e. if the NDI of the current uplink transmission resource assignment message is different from that of the last previously received uplink transmission resource assignment message, then the UE determines that the uplink transmission resource assignment message is indicative of the adaptive retransmission of a new MAC PDU, and the process goes to step 1025. If the NDI is not toggled at step 1030, then the UE determines that the uplink transmission resource assignment message is indicative of the adaptive retransmission of a previous MAC PDU, and process goes to step 1035. At step 1035, the UE transmits a part of the channel coded data which is stored in the HARQ buffer and pointed by the RV through the uplink transmission resource indicated by the uplink transmission resource assignment message.

In short, the UE discriminates the following three types of uplink transmission resource assignment messages and operates depending on the type of the uplink transmission resource assignment message.

The first type of uplink transmission resource assignment message is an uplink transmission resource assignment message indicative of initial transmission of a new MAC PDU. When an uplink transmission resource assignment message of which RV is set to 0 is received for the HARQ process of which HARQ buffer is empty, the uplink transmission resource assignment message is determined as the uplink transmission resource assignment message indicative of initial transmission of a new MAC PDU, whereby the UE transmits the uplink data according to the normal initial transmission process.

The second type of uplink transmission resource assignment message is an uplink transmission resource assignment message indicative of adaptive retransmission of the MAC PDU stored in the HARQ buffer. When an uplink transmission resource assignment message of which the RV is set to a non-zero value and the NDI is not toggled is received for the HARQ process of which HARQ buffer is not empty, the uplink transmission resource assignment message is determined as the uplink transmission resource assignment message indicative of adaptive retransmission of the MAC PDU stored in the HARQ buffer, whereby the UE retransmits the MAC PDU stored in the HARQ buffer according to the normal retransmission process.

The third type of uplink transmission resource assignment message is an uplink transmission resource assignment message indicative of adaptive retransmission of a new MAC PDU. When an uplink transmission resource assignment message of which the RV is set to a nonzero value is received for the HARQ process of which HARQ buffer is empty or an uplink transmission resource assignment message of which the RV is set to a nonzero value and the NDI is toggled is received for the HARQ process of which HARQ buffer is not empty, the uplink transmission resource assignment message is determined as the uplink transmission resource assignment message indicative of adaptive retransmission of a new MAC PDU, whereby the UE ignores the uplink transmission resource assignment message and does not transmit data.

In an embodiment of the present invention, an uplink transmission resource assignment message discrimination method and apparatus using the NDI, RV, and HARQ buffer status in bundled transmission is proposed.

Figure 11:
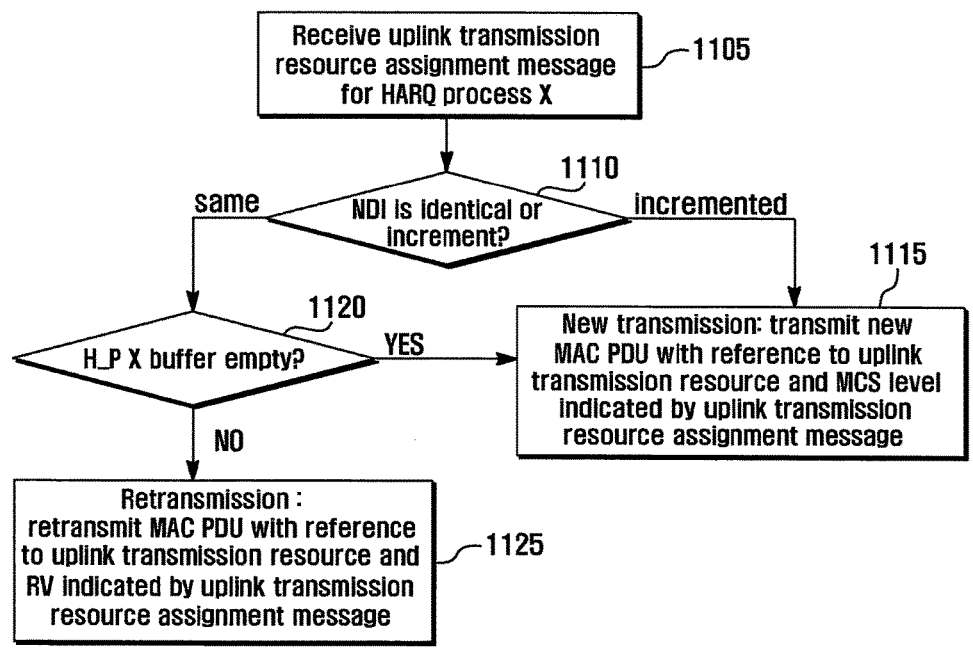
FIG. 11 is a flowchart illustrating a signal transmission method for a mobile communication system according to another embodiment of the present invention.

FIG. 11 is a flowchart illustrating a signal transmission method for a mobile communication system according to another embodiment of the present invention. In this embodiment, the UE first inspects the NDI to simplify the procedure for discriminating the uplink transmission resource assignment messages.

Referring to FIG. 11, a UE receives an uplink transmission resource assignment message for a HARQ process X in step 1105. Once the uplink transmission resource assignment message is received, the UE determines whether the NDI of the uplink transmission resource assignment message is identical to or incremented from the last previously received NDI for the HARQ process X in step 1110. The last previously received NDI can be the NDI of the last previously received uplink transmission resource assignment message for the corresponding HARQ process.

If the NDI of the current uplink transmission resource assignment message is incremented compared to the NDI of the last previously received uplink transmission resource assignment message, i.e. if the value of the NDI is changed, the UE determines that the uplink transmission resource assignment message is indicative of initial transmission of a new MAC PDU so as to form a new MAC PDU based on the information included in the uplink transmission resource assignment message, perform channel coding to the MAC PDU, store the channel coded MAC PDU in the form of channel coded data, and transmit a part of the channel coded data that is pointed to by the RV of the uplink transmission resource assignment message in step 1115. At step 1115, the UE forms a new MAC PDU and performs channel coding and stores the new MAC PDU in the HARQ buffer with reference to the information contained in the uplink transmission resource assignment message and transmits a part of the channel coded MAC PDU that the RV of the uplink transmission resource assignment message points.

If the NDI of the current uplink transmission resource assignment message is identical to that of the last previously received uplink transmission resource assignment message, the UE determines whether the corresponding HARQ buffer is empty in step 1120. If the HARQ buffer is empty, the UE determines that the uplink transmission resource assignment message is indicative of initial transmission of a new MAC PDU such that the process goes to step 1115. Otherwise, if the HARQ buffer is not empty at step 1120, the UE determines that the uplink transmission resource assignment message is indicative of adaptive retransmission of a previous MAC PDU so as to transmit a part of the coded data stored in the HARQ buffer, the part being pointed to by the RV of the uplink transmission resource assignment message, using the uplink transmission resource indicated by the uplink transmission resource assignment message.

Figure 12:
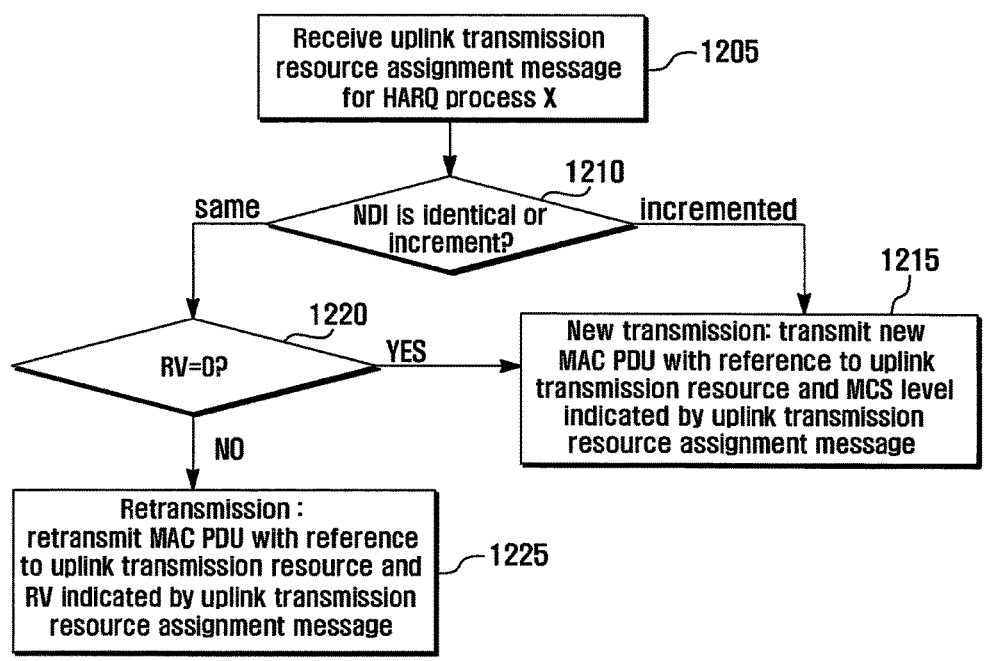
FIG. 12 is a flowchart illustrating a signal transmission method for a mobile communication system according to another embodiment of the present invention.

FIG. 12 is a flowchart illustrating a signal transmission method for a mobile communication system according to another embodiment of the present invention. In this embodiment, the UE discriminates the uplink transmission resource assignment messages indicative of initial transmission and retransmission with reference to the RV rather than HARQ buffer status while simplifying the message discrimination procedure by first inspecting the NDI of the uplink transmission resource assignment message.

Referring to FIG. 12, the UE receives an uplink transmission resource assignment message for a HARQ process X in step 1205. Once the uplink transmission resource assignment message is received, the UE determines whether the NDI of the uplink transmission resource assignment message is identical to or incremented from the last previously received NDI for the HARQ process X in step 1210.

If the NDI of the current uplink transmission resource assignment message is incremented from the last previously received NDI, i.e. if the value of the NDI is changed, the UE determines that the uplink transmission resource assignment message is indicative of initial transmission of a new MAC PDU so as to form a new MAC PDU based on the information included in the uplink transmission resource assignment message, perform channel coding to the MAC PDU, store the channel coded MAC PDU in the form of channel coded data, and transmit a part of the channel coded data that is pointed by the RV of the uplink transmission resource assignment message in step 1215.

If the NDI of the current uplink transmission resource assignment message is identical to that of the last previous received uplink transmission resource assignment message, the UE determines whether the RV of the uplink transmission resource assignment message is set to 0 in step 1220. If the RV of the uplink transmission resource assignment message is set to 0, the UE determines that the uplink transmission resource assignment message is indicative of initial transmission of a new MAC PDU such that the process goes to step 1215. Otherwise, if the RV of the uplink transmission resource assignment message is set to a non-zero value at step 1220, the UE determines that the uplink transmission resource assignment message is indicative of adaptive retransmission of a previous MAC PDU so as to transmits a part of the coded data stored in the HARQ buffer, the part being pointed to by the RV of the uplink transmission resource assignment message, using the uplink transmission resource indicated by the uplink transmission resource assignment message.

The bundled transmission according to an embodiment of the present invention is a feature that a UE retransmits data a predetermined number of times using an uplink transmission resource to solve the problem caused by the lack of transmission power at the cell boundary. In the bundled transmission, the UE sequentially transmits the data pointed to by the RV0, RV2, RV3, and RV1 through the identical uplink transmission resource assigned by the ENB. The ENB performs soft combining on the data received through four uplink transmissions, error check on the combined data, and transmits a HARQ ACK or HARQ NACK.

Figure 13:
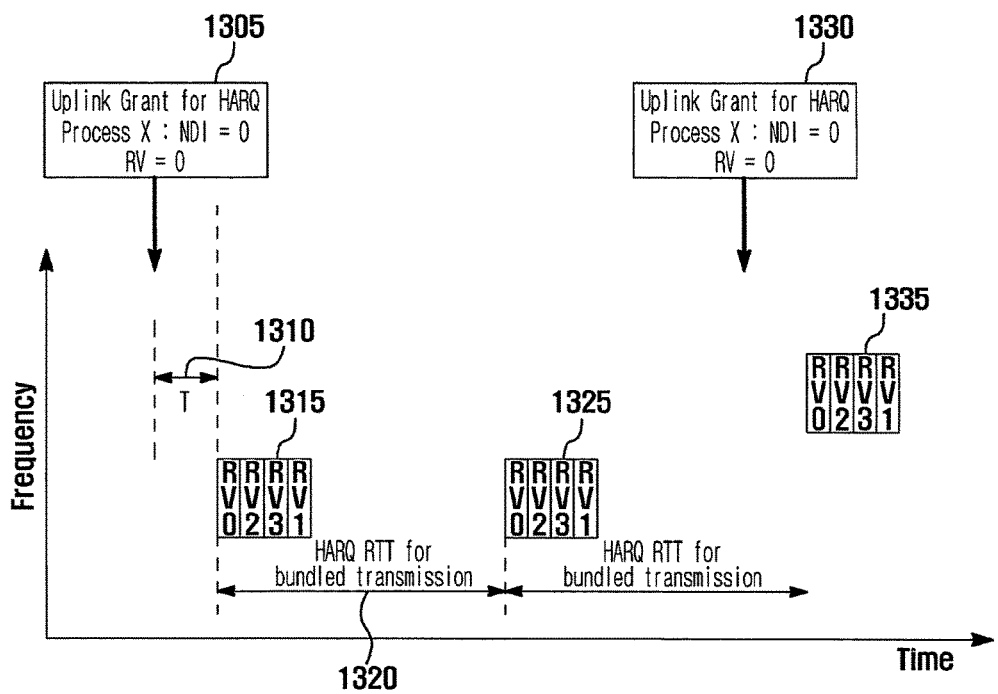
FIG. 13 is a diagram illustrating a bundled transmission process of a signal transmission method for a mobile communication system according to an embodiment of the present invention.

FIG. 13 is a diagram illustrating a bundled transmission process of a signal transmission method for a mobile communication system according to an embodiment of the present invention.

Referring to FIG. 13, an uplink transmission resource assignment message 1305 indicative of initial transmission of a new MAC PDU is transmitted to a UE configured to operate in a bundled transmission mode. Upon receipt of the uplink transmission resource assignment message 1305, the UE transmits the data 1315 pointed by the RV0, RV2, RV3, and RV1 included in the uplink transmission resource assignment message 1305 for the four Transmission Time Intervals (TTIs) after the time T has elapsed from the receipt of the uplink transmission resource assignment message 1305. If a HARQ NACK is received after transmission of the data, then the UE retransmits the data 1325 pointed to by the RV0, RV2, RV3, and RV4 at an interval of the HARQ RTT 1320 that is defined for the bundled transmission.

In the bundled transmission, the same RV is used for the initial transmission and retransmission. That is, the RV of the uplink transmission resource assignment message indicative of adaptive retransmission and the RV of the uplink transmission resource assignment message indicative of initial transmission are identical with each other. For instance, when transmitting an uplink transmission resource assignment message 1330 indicative of adaptive retransmission, the ENB sets the RV of the uplink transmission resource assignment message 1330 to the RV value of the previously transmitted uplink transmission resource assignment message 1305. In the case where the same RV is used for the initial transmission and retransmission, the UE should discriminate the uplink transmission resource assignment messages indicative of initial transmission and retransmission with reference to the NDI and HARQ buffer status. If an uplink transmission resource assignment message indicative of initial transmission is lost as aforementioned, it is impossible to discriminate the uplink transmission resource assignment messages indicative of initial transmission and retransmission only with the NDI and HARQ buffer status. Assuming that the uplink transmission resource assignment message 1305 indicative of initial transmission is lost such that the UE receives the uplink transmission resource assignment message 1330 indicative of retransmission without awareness of the uplink transmission resource assignment message 1305, the NDI is likely to be toggled in the uplink transmission resource assignment message 1330 as compared to the previous uplink transmission resource assignment message 1305. Accordingly, the UE is likely to misidentify the uplink transmission resource assignment message 1330 indicative of adaptive retransmission as an uplink transmission resource assignment message indicative of initial transmission.

In order to solve this problem, the signal transmission method according to an embodiment of the present invention sets the RV to indicate a number of retransmission times rather than to point to corresponding data.

Figure 14:
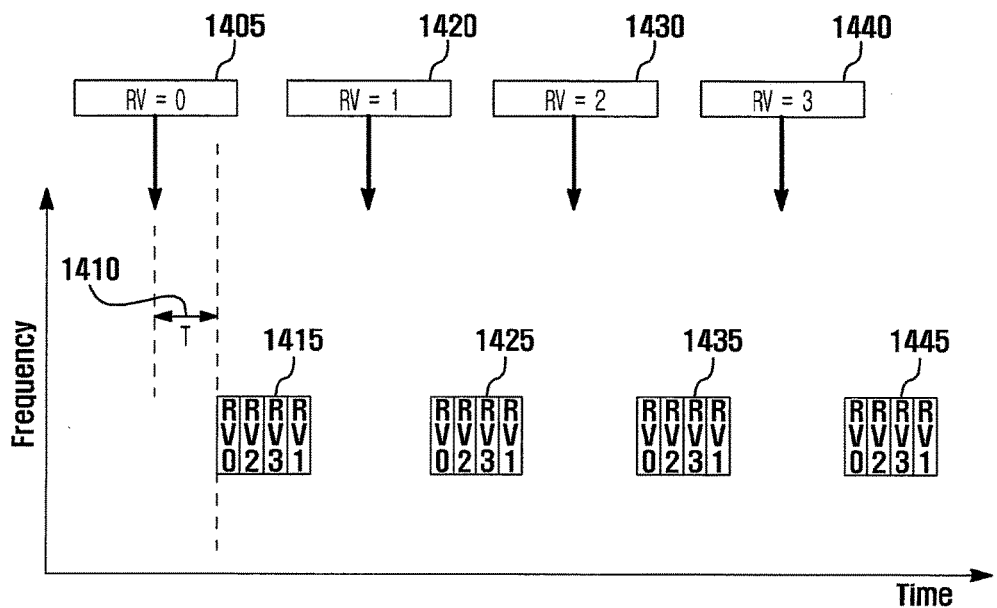
FIG. 14 is a diagram illustrating a diagram illustrating a bundled transmission process of a signal transmission method for a mobile communication according to another embodiment of the present invention.

FIG. 14 is a diagram illustrating a diagram illustrating a bundled transmission process of a signal transmission method for a mobile communication according to another embodiment of the present invention.

Referring to FIG. 14, when an uplink transmission resource assignment message 1405 indicative of initial transmission and first to third uplink transmission resource assignment messages 1420, 1430, and 1440 indicative of retransmission are transmitted in sequential order, the ENB sets the RVs of the uplink transmission resource assignment messages 1405, 1420, 1430, and 1440 to 0, 1, 2, and 3, respectively. That is, the value of RV increments by 1 from 0 as the number of transmissions of uplink transmission resource assignment messages increases.

If the RV of the uplink transmission resource assignment message for the HARQ process of which the buffer is not empty is set to a non-zero value, i.e. if an uplink transmission resource assignment message indicative of adaptive retransmission is received without receipt of an uplink transmission resource assignment message indicative of initial transmission, then the UE ignores the uplink transmission resource assignment message indicative of adaptive retransmission.

Figure 15:
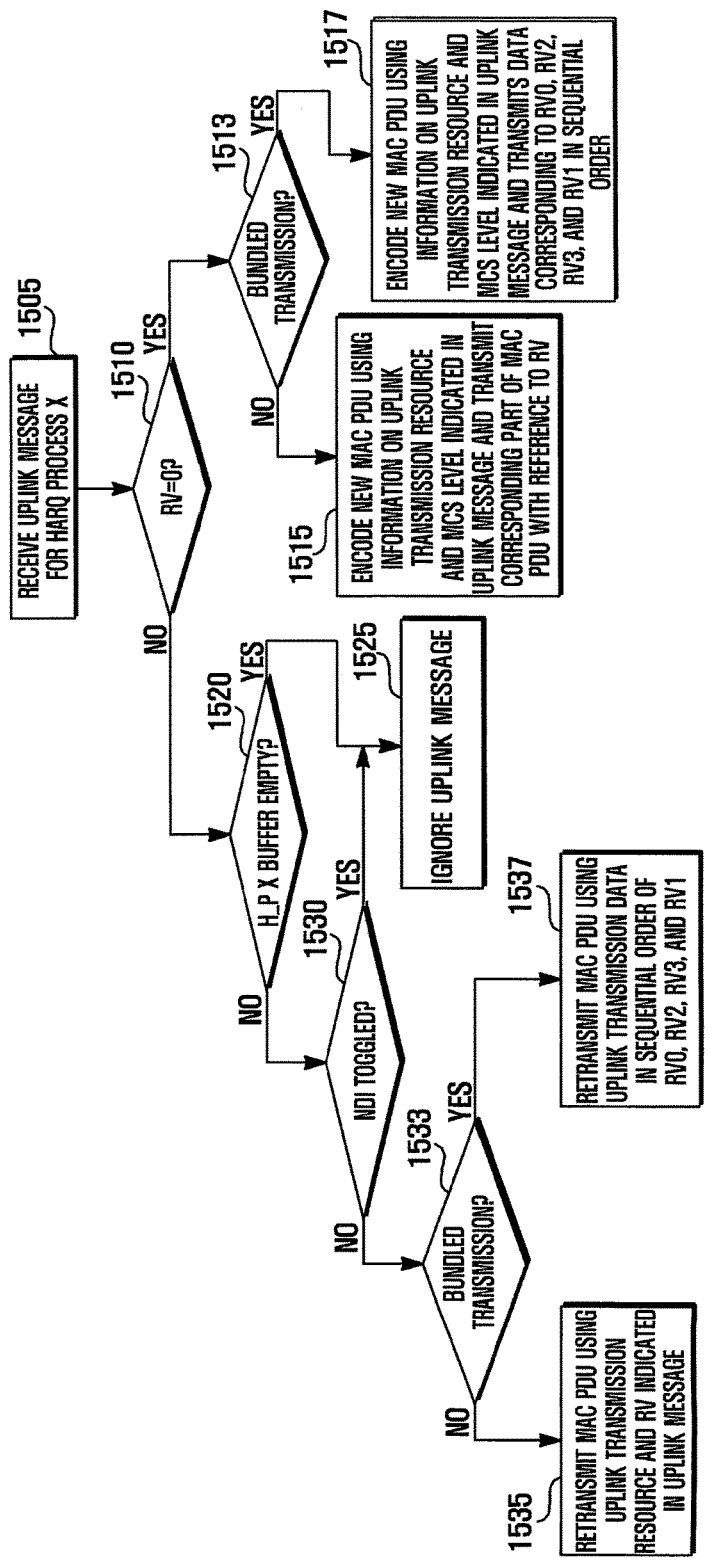
FIG. 15 is a flowchart illustrating a signal transmission method for a mobile communication system according to another embodiment of the present invention.

FIG. 15 is a flowchart illustrating a signal transmission method for a mobile communication system according to another embodiment of the present invention.

Referring to FIG. 15, a UE receives an uplink transmission resource assignment message for a HARQ process X in step 1505. Once the uplink transmission resource assignment message is received, the UE determines whether the RV of the uplink transmission resource assignment message is set to 0 in step 1510. If the RV of the uplink transmission resource assignment message is set to 0, then the UE determines that the uplink transmission resource assignment message is indicative of initial transmission of a new MAC PDU and determines whether the uplink transmission resource assignment message is indicative of bundled transmission in step 1513. Whether the uplink transmission resource assignment message is indicative of bundled transmission is configured by a control message of an upper layer. If the uplink transmission resource assignment message is indicative of bundled transmission, then the process goes to step 1517. Otherwise, if the uplink transmission resource assignment message is not indicative of bundled transmission, then the process goes to step 1515. At step 1515, the UE generates a new MAC PDU and performs channel coding on the MAC PDU based on the information extracted from the uplink transmission resource assignment message, stores the channel coded data within the HARQ buffer, and transmits the data pointed to by the RV (=0) of the uplink transmission resource assignment message. At step 1517, the UE generates a new MAC PDU and performs channel coding on the MAC PDU based on the information extracted from the uplink transmission resource assignment message, stores the channel coded data within the HARQ buffer, and transmits the data pointed by the RV0, RV2, RV3, and RV1 in sequential order.

If the RV of the uplink transmission resource assignment message is set to a non-zero value, then the UE determines whether the HARQ buffer for the HARQ process X is empty in step 1520. If the HARQ buffer is empty, then the UE determines that the uplink transmission resource assignment message is indicative of adaptive retransmission of a new MAC PDU. Here, the empty HARQ buffer means that an uplink transmission resource assignment message indicative of initial transmission of a new MAC PDU is lost after the HARQ buffer is flushed. As aforementioned, the HARQ retransmission is restricted to the maximum number of HARQ transmissions. Accordingly, when the uplink transmission resource assignment message indicative of initial transmission is lost, the UE does not know how many times the uplink transmission resource assignment message indicative of adaptive retransmission is transmitted. If the last possible retransmission point in time is misidentified, then the UE may transmit the data through an unavailable uplink transmission resource that is reserved for the UE at that time, resulting in interference. Accordingly, if the RV of the uplink transmission resource assignment message is set to a nonzero value and the HARQ buffer is empty, then the UE ignores the uplink transmission resource assignment message and does not transmit data in step 1525. If the HARQ buffer is not empty at step 1520, the UE determines whether the NDI of the current uplink transmission resource assignment message is toggled as compared to the last previously received uplink transmission resource assignment message in step 1530.

If the NDI of the current uplink transmission resource assignment message is toggled, i.e. the NDI of the current uplink transmission resource assignment message is not identical to the NDI value of the last previously received uplink transmission resource assignment message for the HARQ process, then the UE determines that the uplink transmission resource assignment message is indicative of retransmission of a new MAC PDU, and process goes to step 1525. Otherwise, if the NDI is not toggled, the UE determines that the uplink transmission resource assignment message is indicative of adaptive retransmission of the previous MAC PDU and determines whether the uplink transmission resource assignment message is indicative of bundled transmission in step 1533. If the uplink transmission resource assignment message is not indicative of bundled transmission, then the UE transmits a part (of the coded data pointed by RV0, RV2, RV3, and RV1 within the HARQ buffer) corresponding to the RV of the uplink transmission resource assignment message using the uplink transmission resource indicated by the uplink transmission resource assignment message in step 1535. Otherwise, if the uplink transmission resource assignment message is indicative of the bundled transmission, then the UE ignores the RV of the uplink transmission resource assignment message and transmits the data (MAC PDU) stored within the HARQ buffer in sequential order of the RV0, RV2, RV3, and RV1 in step 1537.

In short, the UE discriminates following three types of uplink transmission messages and operates depending on the type of the uplink transmission resource assignment message.

The first type of uplink transmission resource assignment message is an uplink transmission resource assignment message indicative of initial transmission of a new MAC PDU. When an uplink transmission resource assignment message of which RV is set to zero is received for the HARQ process of which HARQ buffer is empty, the uplink transmission resource assignment message is determined as the uplink transmission resource assignment message indicative of initial transmission of a new MAC PDU, whereby the UE transmits the uplink data according to the normal initial transmission process.

The second type of uplink transmission resource assignment message is an uplink transmission resource assignment message indicative of adaptive retransmission of the MAC PDU stored in the HARQ buffer. When an uplink transmission resource assignment message of which RV is set to a nonzero value and the NDI is not toggled compared to the previous uplink transmission resource assignment message is received for the HARQ process of which HARQ buffer is not empty, the uplink transmission resource assignment message is determined as the uplink transmission resource assignment message indicative of adaptive retransmission of the MAC PDU stored in the HARQ buffer, whereby the UE retransmits the MAC PDU stored in HARQ buffer according to the normal retransmission process. The UE configured to operate in bundled transmission mode ignores the RV of the uplink transmission resource assignment message and transmits the data stored in the HARQ buffer in sequential order, e.g. the order of the RV0, RV2, RV3, and RV1.

The third type of uplink transmission resource assignment message is an uplink transmission resource assignment message indicative of adaptive retransmission of a new MAC PDU. When an uplink transmission resource assignment message of which RV is set to a nonzero value is received for the HARQ process of which HARQ buffer is empty or an uplink transmission resource assignment message of which RV is set to nonzero value and the NDI is toggled is received for the HARQ process of which HARQ buffer is not empty, the uplink transmission resource assignment message is determined as the uplink transmission resource assignment message indicative of adaptive retransmission of a new MAC PDU, whereby the UE ignores the uplink transmission resource assignment message and does not transmit data.

Figure 16:
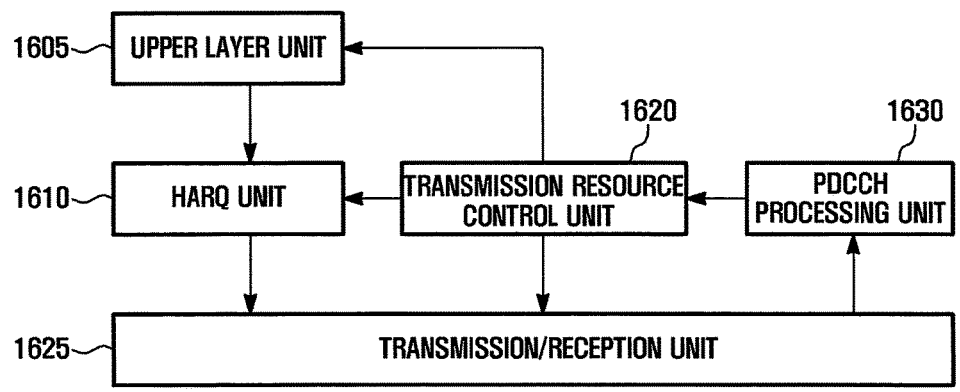
FIG. 16 is a block diagram illustrating a configuration of a signal transmission apparatus of a UE for a mobile communication system according to an embodiment of the present invention.

FIG. 16 is a block diagram illustrating a configuration of a signal transmission apparatus of a UE for a mobile communication system according to an embodiment of the present invention.

Referring to FIG. 16, the signal transmission apparatus includes an upper layer unit 1605, a HARQ unit 1610, a transmission resource control unit 1620, a transmission/reception unit 1625, and a PDCCH processing unit 1630.

The transmission/reception unit 1625 is responsible for receiving a Physical Downlink Control Channel (PDCCH) through a radio channel and communicating other traffic. The transmission/reception unit 1625 decodes the signal received on the PDCCH and outputs the decoded signal to the PDCCH processing unit 1630.

The PDCCH processing unit 1630 performs a CRC check on the decode signal output by the transmission/reception unit 1625 and outputs the uplink transmission resource assignment message that passes the CRC check to the transmission resource control unit 1620. The transmission resource control unit 1620 extracts the NDI and RV from the uplink transmission resource assignment message and discriminates the uplink transmission resource assignment message indicative of initial transmission of a new MAC PDU, adaptive retransmission of the MAC PDU stored in the HARQ buffer, and adaptive retransmission of a new MAC PDU with reference to the NDI, RV, and the HARQ buffer status. If the uplink transmission resource assignment message is indicative of initial transmission of a new MAC PDU, the transmission resource control unit 1620 controls the upper layer unit 1605 to determine the size of the MAC PDU to be transmitted with reference to a number of assigned transport blocks and MCS level, generate the MAC PDU of the determined size, and deliver the MAC PDU to the HARQ process. If the uplink transmission resource assignment message is indicative of adaptive retransmission of the previous MAC PDU, the transmission resource control unit 1620 controls the HARQ unit 1610 to perform the adaptive retransmission of the previous MAC PDU. If the uplink transmission resource assignment message is indicative of adaptive retransmission of a new MAC PDU, the transmission resource control unit 1620 ignores the uplink transmission resource assignment message and does not transmit data.

The upper layer unit 1605 represents the PDCP layer device and multiplexer of MAC layer. The HARQ unit 1610 includes a plurality of HARQ processes and performs HARQ operation for each of the HARQ processes.

As described above, the signal transmission method and apparatus for a mobile communication system according to the present invention enables a UE to accurately discriminate the uplink transmission resource assignment messages indicative of initial transmission and retransmission of data, thereby reducing a waste of resources caused by a misidentification of the uplink transmission resource assignment message.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A signal transmission method of a user equipment for a mobile communication system, comprising:
   receiving an uplink transmission resource assignment message including a new data indicator (NDI) from a base station;
   identifying whether a buffer of a hybrid automatic repeat request (HARQ) process is empty;
   performing a new transmission based on a value of a redundancy version (RV) set to 0 without regard to the NDI, if the buffer is empty;
   performing an adaptive retransmission, from the user equipment to the base station, by which a transmission resource of a media access protocol data unit (MAC PDU) for the HARQ process is adjusted, if the buffer is not empty and if the NDI is not toggled;
   identifying a last available retransmission time based on a received message including information on a maximum number of transmissions of a media access control protocol data unit (MAC PDU) in a hybrid automatic repeat request (HARQ) process; and
   flushing the buffer after the last available retransmission time.

2. The signal transmission method of claim 1, wherein performing a new transmission comprises transmitting a new MAC PDU to the base station.

3. A user equipment for a mobile communication system, comprising:
   a transceiver configured to transmit and receive signals; and
   a controller configured to receive an uplink transmission resource assignment message including a new data indicator (NDI) from a base station, identify whether a buffer of a hybrid automatic repeat request (HARQ) process is empty, perform a new transmission based on a redundancy version (RV) set to 0 without regard to the NDI if the buffer is empty, perform an adaptive retransmission, from the user equipment to the base station, by which a transmission resource of a media access control protocol data unit (MAC PDU) for the HARQ process is adjusted, if the buffer is not empty and if the NDI is not toggled, identify a last available retransmission time based on a received message including information on a maximum number of transmissions of a media access control protocol data unit (MAC PDU) in a hybrid automatic repeat request (HARQ) process, and flush the buffer after the last available retransmission time.

4. The user equipment of claim 3, wherein the controller is further configured to transmit a new MAC PDU to the base station if performing a new transmission.

* * * * *

UNITED STATES PATENT AND TRADEMARK OFFICE
CERTIFICATE OF CORRECTION

| | |
|---|---|
| PATENT NO. | : 10,177,883 B2 |
| APPLICATION NO. | : 12/534999 |
| DATED | : January 8, 2019 |
| INVENTOR(S) | : Soeng-Hun Kim et al. |

It is certified that error appears in the above-identified patent and that said Letters Patent is hereby corrected as shown below:

In the Claims

In Column 18, Claim 1, Line 8:
"performing a new transmission based on a value of a"
Should read:
-- performing a new transmission based on a --

Signed and Sealed this
Third Day of September, 2019

Andrei Iancu
*Director of the United States Patent and Trademark Office*